United States Patent [19]
Saliga

[11] Patent Number: 5,469,363
[45] Date of Patent: Nov. 21, 1995

[54] ELECTRONIC TAG WITH SOURCE CERTIFICATION CAPABILITY

[76] Inventor: Thomas V. Saliga, 4702 Baycrest Dr., Tampa, Hillsborough County, Fla. 33615

[21] Appl. No.: 246,147

[22] Filed: May 19, 1994

[51] Int. Cl.6 ............................................. G06K 19/07
[52] U.S. Cl. ........................................ 364/478; 235/380
[58] Field of Search ................................. 364/478, 468, 364/408, 401–403, 464.01–464.03; 235/380, 379, 375, 385; 340/551, 572, 825.35, 568

[56] References Cited

U.S. PATENT DOCUMENTS

| | | | |
|---|---|---|---|
| 4,713,753 | 12/1987 | Boebert et al. | 364/200 |
| 4,727,243 | 2/1988 | Savar | 235/379 |
| 5,065,321 | 11/1991 | Bezos et al. | |
| 5,113,344 | 5/1992 | Kellogg et al. | |
| 5,151,684 | 9/1992 | Johnsen | |
| 5,153,842 | 10/1992 | Dlugos, Sr. et al. | 364/478 |
| 5,168,263 | 12/1992 | Drucker | |
| 5,225,990 | 7/1993 | Bunce et al. | 364/478 |
| 5,313,052 | 5/1994 | Watanabe et al. | 235/375 |
| 5,340,968 | 8/1994 | Watanabe et al. | 235/380 |

Primary Examiner—James P. Trammell
Attorney, Agent, or Firm—David Kiewit

[57] ABSTRACT

An inventory control system uses an electronic tag that keeps an unalterable log of each step in the handling of a controlled item, which may be a flight safety critical aircraft replacement part. The tag is electrically powered via an inductive coupling to a computer with which it communicates, and comprises a non-volatile computer memory element configured so that data may be written into unused portions of it, but so that no existing data can be overwritten or erased. Each tag contains an unalterable secret identification record that is only accessible to a user who has a valid password. As a countermeasure against sophisticated theft attempts involving communicating with the "smart tag" to defeat the security system by learning the password and thereafter altering identification records, etc., the tag permits only a limited number of attempts to read out the secret identification number.

20 Claims, 4 Drawing Sheets

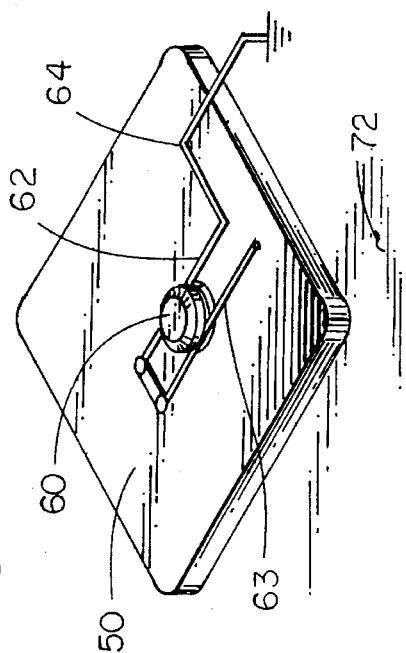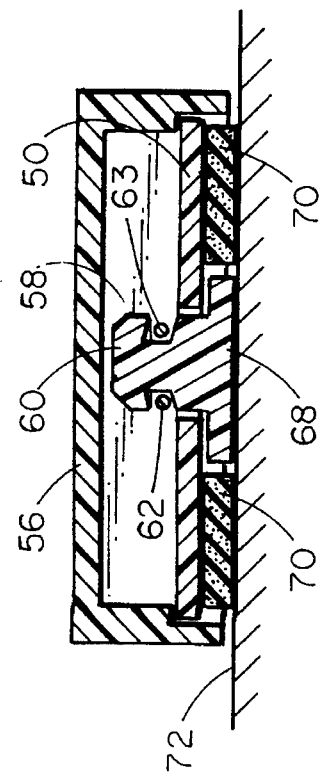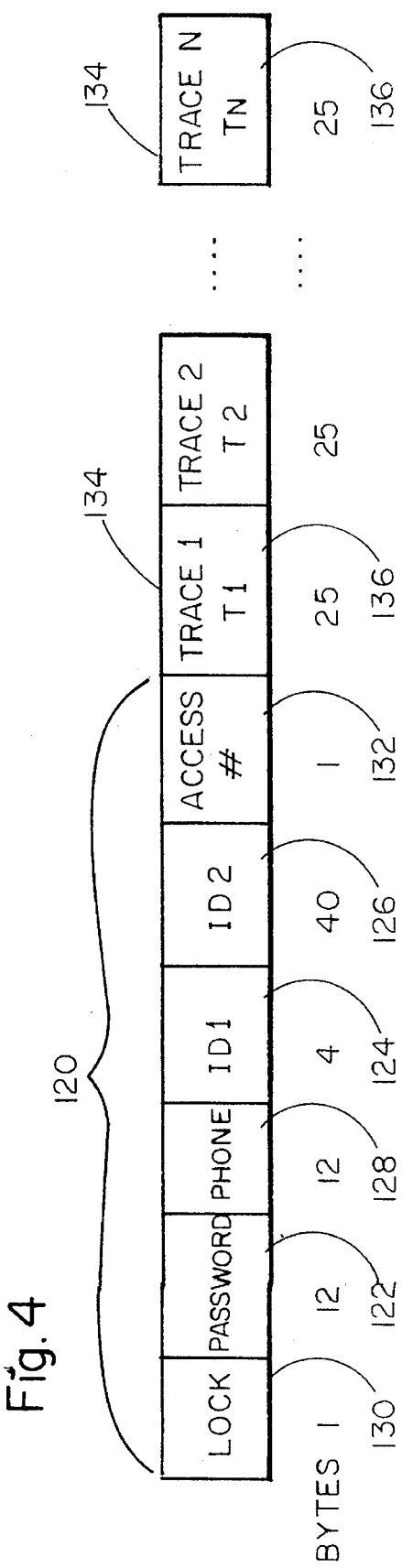

ELECTRONIC TAG WITH SOURCE CERTIFICATION CAPABILITY

BACKGROUND OF THE INVENTION

Many industries require detailed tracing of critical inventoried items from a manufacturer to an end user. Of particular interest is the FAA mandated tracing and certification of flight safety critical aircraft components used both in original equipment manufacture and as repair parts. Replacement parts may pass through a number of hands and spend an unpredictable amount of time in inventory before being used. The multiplicity of flow paths and the potentially long delay between manufacture and use offers an opportunity for surreptitious substitution of inferior, lower-cost parts—a practice that has led to fatal aircraft crashes. There is a need for a reliable and secure system of tracking aircraft parts from their point of manufacture to their point of ultimate use.

The art of electronic article surveillance (EAS) tagging provides useful technical information on the use of small, low-cost tags that can be attached to an article and that can be interrogated electronically. EAS tags are most commonly used for reducing theft from retail establishments by setting off an alarm whenever a tagged article is removed from a controlled area. Notable among this art are:

U.S. Pat. No. 5,168,263 to Drucker et al, who teach the use of a "smart tag" containing a tag microprocessor that communicates with other security apparatus via a radio-frequency link; and U.S. Pat. No. 5,151,684 to Johnsen, who teaches a tag that sounds an alarm if the tag is removed from a protected article or if the article is removed from the protected store. Johnsen's tag communicates with other equipment to receive a signal indicating that the article has been sold, and disables its alarm in response to the "sold" message.

The EAS art includes a variety of methods of dealing with thieves who might try either to remove a tag prior to stealing merchandise or to shield the tag on an article of merchandise from detection apparatus located at the exit to a store. The tag art does not extend to providing countermeasures against sophisticated theft attempts involving communicating with a "smart tag" in order to defeat the security system by altering identification records or other data stored in the tag.

Other sorts of "smart tags", "smart tracers" or small datalogging devices are known for use in monitoring the operation of a piece of machinery or for following the progress of a complex item of equipment through a multi-step manufacturing process. Notable among the prior art in this area are:

U.S. Pat. No. 5,113,344 to Kellogg et al., who teach the use of a tag providing both datalogging and control functions for a materials handling vehicle. Kellogg et al.'s tag employs a non-volatile computer memory segmented into a read-only portion (which contains vehicle-specific operational limit data used by a general-purpose on-board vehicle controller to control vehicle speed, etc.) and a read/write portion (which may be used for maintenance-related operational data). Kellogg et al. use an EEPROM as their non-volatile memory device. This allows the device to be disconnected from electrical power for shipment and so that the vehicle to which it is attached can be maintained without loss of data.

U.S. Pat. No. 5,065,321 to Bezos et al, who teach the use of an on-board computer-based recorder to collect historical operational data and communicate these data, via an inductive coupling, to another portion of the measurement system.

Although a variety of measurements, data storage and retrieval methods have been provided by "smart tracer" datalogging devices, these devices are generally used in situations where data security is of little concern. This art area does not provide teaching of a data storage element resistant to sophisticated tampering.

SUMMARY OF THE INVENTION

It is an object of the invention to provide an inventory control tag that keeps an unalterable log of each step in the handling of a controlled replacement part. It is an additional object of the invention to ensure such a tag has a shelf life comparable to that of the controlled part.

It is a further object of the invention to provide an electronic tag, usable for inventory tracing in a multi-transaction distribution process, that is electrically powered via an inductive coupling to a computer with which it communicates, and that comprises a non-volatile computer memory element configured so that data may be written into unused portions thereof, but so that no existing data can be overwritten or erased.

It is yet a further object of the invention to provide an electronic inventory control tag having a non-volatile memory and having means of detecting when the tag is removed from an article.

It is an object of the invention to provide a smart tag that contains an unalterable identification record and that permits only a limited number of attempts to read that record.

It is an object of the invention to provide an inventory control system comprising a plurality of local inventory processing computers and a plurality of physically sealed, computer-controlled tags. In this system a tag has a secure mode that is irreversibly entered the first time a 'lock' message incorporating an identification code is communicated to the tag's microprocessor. Thereafter each local inventory processing computer has the capability to communicate with and thereby provide electrical power to that tag, to write location-specific data to predetermined and previously unwritten portions of the non-volatile memory on the tag, and to read the identification code from the tag.

DESCRIPTION OF THE DRAWING

FIG. 2a of the drawing is a cross-sectional view of a tamper-indicating seal that is part of a preferred tag.

FIG. 2b of the drawing is a schematic elevational top view of the removable seal element shown in FIG. 2a.

FIG. 4 of the drawing is a block diagram of non-volatile memory allocation in a tag.

DETAILED DESCRIPTION

Figure 1:
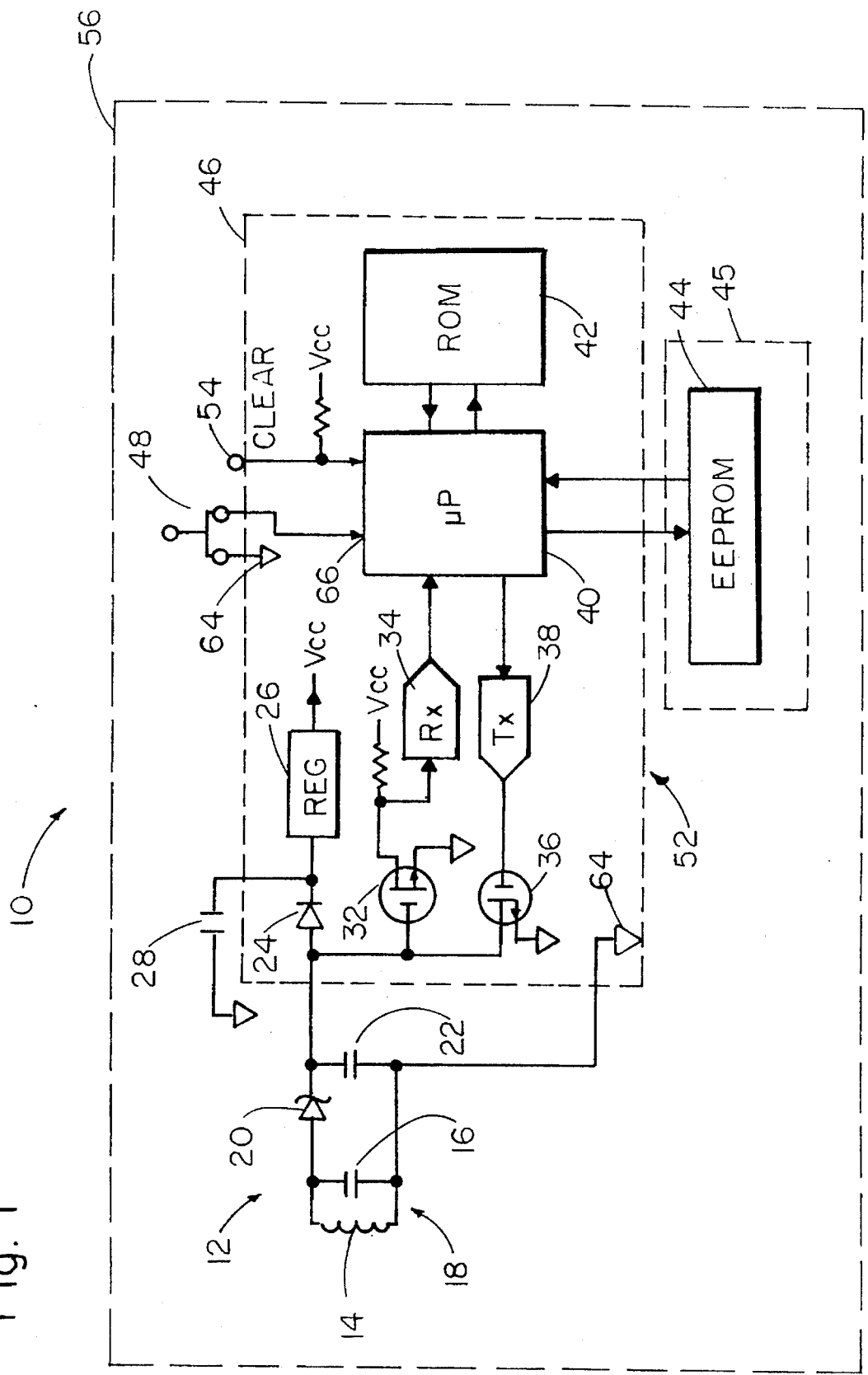
FIG. 1 of the drawing is a schematic block diagram of the electrical circuit elements on a tag.

Turning now to FIG. 1 of the drawing, one finds a schematic block diagram of a tag 10 of the invention. The preferred tag 10 has no battery or other internal source of electrical power, and is expected to have a shelf life at least as long as the shelf life of a protected article. The tag 10 is powered via an inductive coupling circuit 12 that is also used for communication between the tag 10 and the balance of the security system, as has been taught, inter alia by Vinding in U.S. Pat. No. 3,299,424. The inductive coupling circuit 12 includes an antenna coil 14 and a capacitor 16 constituting a tuned circuit 18 that is preferably tuned to resonate at a frequency of about twenty seven megahertz. Electrical power received by the tuned circuit 18 is rectified (e.g., by a Schottky diode 20) and smoothed by a resistor-capacitor pair 22. (The RC time constant of the resistor-capacitor pair 22 is selected to be the minimum needed to adequately smooth the rectified DC output of the Schottky diode 20, and is constrained to be small enough that it does not also obliterate data pulses). Smoothed and rectified DC current passes through a blocking diode 24 and thence into a regulator 26 that has the circuit supply voltage, $V_{CC}$, as its output 27. Some of the charge passing through the blocking diode 24 is stored on a large capacitor 28 that powers the circuit during part of the communication process, as will be subsequently described.

Data are preferably downloaded from an interrogator 30 (shown in FIG. 3) to the tag 10 by momentarily turning off the RF power supplied by the interrogator 30, which causes a receiver-controlling field effect transistor 32 to turn off. This, in turn, causes logic circuits in the data receiver 34 to respond to serial data in a manner well known in the art. Data are uploaded from the tag 10 to the interrogator 30 via a transmitter field effect transistor 36 that is momentarily turned on by the data transmitter 38 for each zero in a serial message. During the intervals that the transmitter FET 36 is ON, energy stored on the storage capacitor 28 maintains an adequate input voltage on the voltage regulator 26.

The communication and data storage tasks of the tag 10 are preferably controlled by an 8-bit CMOS microprocessor 40, which may be a Model 68C05 made by the Motorola Corporation, a Model 80C51 made by the Intel Corporation, or the like. The microprocessor 40 operates under control of a program stored in a Read Only Memory 42, which is shown in FIG. 1 of the drawing as a separate block, although it is common in the art to package the ROM 42 with the microprocessor 40. It is expected that the microprocessor 40, ROM 42, and several other components will be made as a single semicustom integrated circuit, as indicated by a phantom block 46 in FIG. 1 of the drawing.

Data from the operation of the tag 10 are stored in an EEPROM 44, which is a standard component and may be a National Semiconductor Corporation NMC93C66, which has a capacity of five hundred and twelve bytes. The EEPROM 44 is preferably a separate component (e.g., with a housing indicated in phantom as 45) that can be mounted with the microprocessor circuitry 46, the storage capacitor 28, the inductive coupling circuit 12, and a one-time actuable circuit element 48 on a circuit board 50. After the tag circuitry 52 is tested, a logical input 54 to the microprocessor 40 is toggled to clear the EEPROM 44, and the tag circuitry 52 is potted or sealed into a tamper-proof enclosure 56 to complete the manufacturing process. Once the tag 10 is sealed, the inductive coupling circuit 12 is the only means by which data can be loaded into or read from it.

Turning now to FIGS. 2a and 2b of the drawing, one finds a preferred embodiment of the one-time actuable binary element, or tamper switch 48. As seen in cross-section in FIG. 2a of the drawing, a plug 58 has a mushroom-like cap 60 protruding through the circuit board 50. The cap 60 overhangs two thin wires 62, 63 (e.g., AWG 30 wires) that are connected in series between a local ground 64 on the circuit board 50 and a logical "tamper input" 66 to the microprocessor 40. The base of the plug 58 has an adhesive layer 68 that is either the same as or stronger than the adhesive layer 70 on the back of the circuit board 50. The tag 10 may be preferably shipped with a protective overlayer (not shown) of material that does not adhere well to the adhesives 68, 70. When the tag 10 is to be irreversibly associated with a specific protected item, this overlayer is peeled off and the tag 10 is attached to a surface 72 of a protected article. Any subsequent attempt to remove the tag 10 from the surface 72 (e.g., in order to reuse the tag 10 on a counterfeit article) is likely to leave the plug 58 still adhering to the original surface 72. The act of pulling the plug 58 out through the circuit board 50 is expected to break one or both of the wires 62, 63 and thereby float the tamper input 66 to the microprocessor 40. Thus, in the normal course of events, a tagged protected article can be passed through numerous handling transactions in a multi-step distribution process, can be interrogated for evidence of tampering at each of these steps, and can finally be effectively destroyed and permanently invalidated by being removed from the protected part when that part is at the point of being installed on an aircraft. Although the preferred means of physically attaching the tag to the protected article uses well-known "peel-off" adhesives, it will be understood that a variety of other approaches known in the electronic article surveillance art can be employed as a tamper switch 48.

Figure 3:
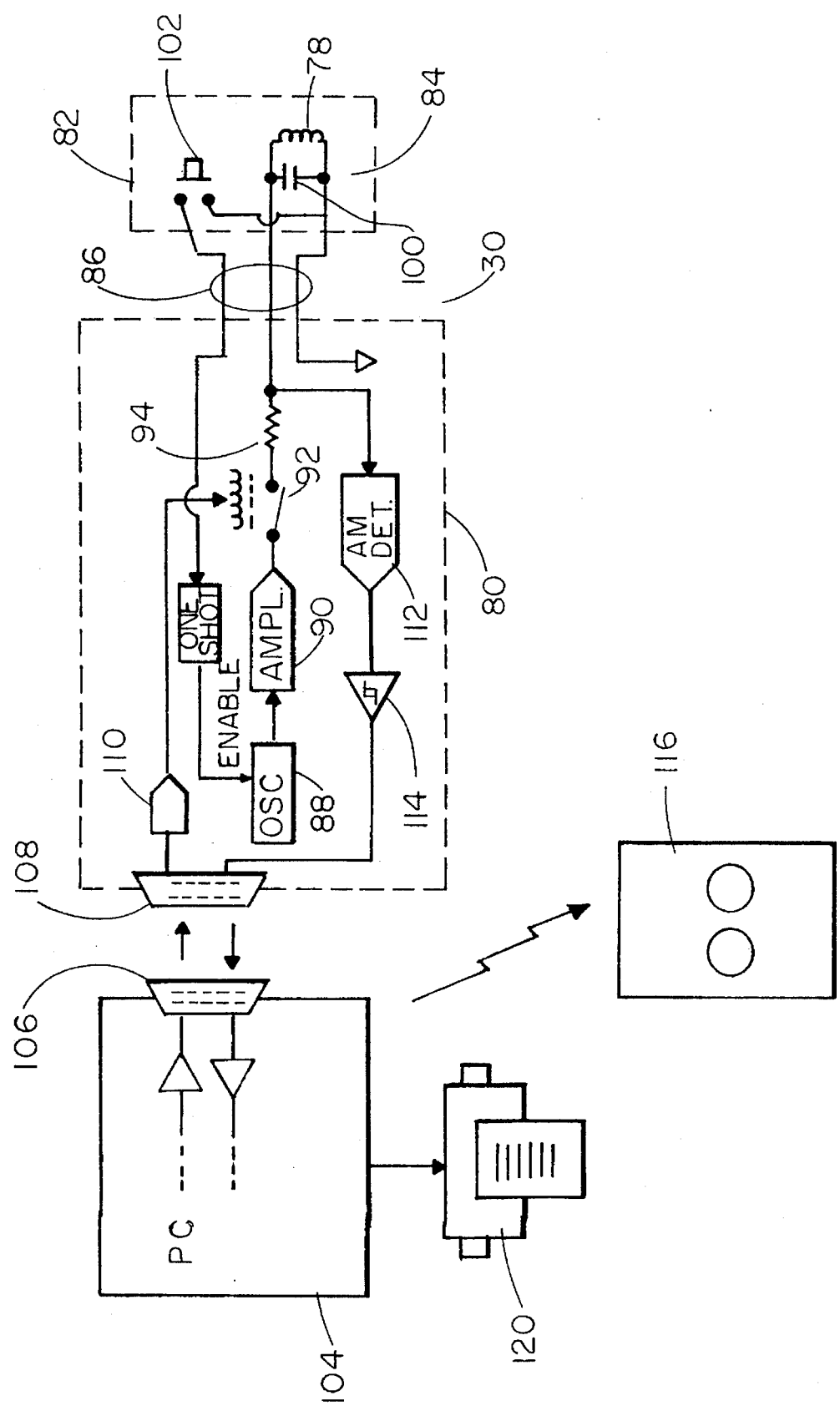
FIG. 3 of the drawing is a schematic block diagram of a tag interrogation station.

Turning now to FIG. 3 of the drawing, one finds a schematic block diagram of a interrogator 30, which may be configured as the illustrated combination of a battery-powered portable interface unit 80 and a handheld wand 82 connected with a shielded cable 86. in the interest of providing a simpler presentation the battery and power supply circuitry in the interface unit 80 are not shown in the view of FIG. 3. It will be understood to those skilled in the art that the packaging arrangement shown in FIG. 3 is one expected to be convenient for a large number of users, but that other configurations may well be employed.

A crystal oscillator 88 in the interface unit 80 generates an RF voltage at a preferred frequency of twenty seven megahertz that is input to an RF power amplifier 90 (preferably having an available output power of approximately one half watt). The RF power from the amplifier 90 is coupled, via a relay 92 and a power limiting resistor 94 (which is nominally fifty ohms) to a resonant wand circuit 84 comprising a coil 98 and a capacitor 100. The oscillator 88 is preferably turned on manually with a pushbutton switch 102 when an operator has placed the wand 82 adjacent a tag 10. The closure of the switch 102 activates a one-shot timer 103 that enables the oscillator 88 for a limited time interval (typically about nine tenths of a second). This interval is chosen so that it exceeds the sum of all the power-up time requirements and the time required for data interchange.

The data interface unit 80 preferably serves as an interface between the tag 10 and a local computer 104, which may be any of a number of such machines, but which is expected to be one of the many "IBM PC-compatible" machines built around an Intel 80386, or similar, microprocessor. Data entered into or stored in the local computer 104 are downloaded in a half duplex mode into the tag 10 via a conventional serial port 106, which is connected to a corresponding serial port 108 on the data interface unit 80. A RS232 receiver circuit 110 in the data interface unit 80 causes the solid state relay 92 to open whenever a zero is to be sent to the tag 10. As previously noted herein, data are uploaded from the tag 10 to the interrogator 30 via a transmitter field effect transistor 36 that is momentarily turned on by the data transmitter 38 for each zero in a serial message. When the transmitter FET 36 turns on, this causes a drop in the voltage at the output to the power limiting resistor 94, which is demodulated by an amplitude detector circuit 112 that incorporates well known automatic gain control and binary decision threshold capabilities. The output of the detector 112 is amplified by another circuit 114 to standard serial interface levels that are supplied via the serial ports 108, 106 to the local computer 104.

As is well known in the art, the local computer 104 may conveniently interchange data via the public switched telephone network, or other known telecommunication means 115, with a central computer 116. Moreover, it is expected that the local computer will have suitable permanent record output devices (e.g., a printer 118) for generating and archiving operational records.

The part-tracking method offered by the apparatus of the invention depends on the use of the EEPROM 44 to record data on successive events as the protected part moves through a distribution system, and to maintain a covert identification and tracking code specific to that part. This process may preferably involve the use of two different security encoding levels, and is best supplied by an EEPROM 44 memory segmented as shown in FIG. 4 of the drawing. An initial block 120 in the EEPROM 44 is written when the tag 10 is originally assigned to an item to be tracked. The initial block 120 may include a manufacturer's valid password 122; a secret identification record 124 that is uniquely associated with a specific chosen item and that will be called the secret identification number (since it has some of the functional attributes of a serial number, even though it is not a simple sequentially assigned number); an overt manufacturer's item identification record 126; and a telephone number 128 assigned to the manufacturer of the protected item. The initial block always includes at least one record (hereinafter called the lock byte 130) that is set when the EEPROM 44 is initially written, thus beginning a secure mode of operation for the tag 10. As will subsequently be discussed with respect to FIG. 5 of the drawing, the microprocessor 40 reads the lock byte 130 when it is powered up. If the lock byte 130 is set, the microprocessor 40 may write data to unused portions of the EEPROM 44, but will neither erase nor overwrite those portions of the EEPROM memory 44 that already contain data. The sole exception to this rule involves an access attempt number record 132, or byte, that contains a current record of the number of times a given tag 10 has been interrogated. The access attempt byte 132, which may be conveniently set to hold the number "1" at the time of initiation, is usually incremented and overwritten with a new datum each time a request to read the secret identification code is made.

In addition to the initial block 120, the EEPROM 44 holds a sequence of trace records 134, the maximum number of which is limited by the capacity of the EEPROM memory 44. As will subsequently discussed, each inventory handling transaction results in a trace record 134 being written into the EEPROM 44 as long as the number of trace records already stored in the EEPROM 44 is no more than one fewer than the maximum number of such records that can be stored without exhausting the remaining capacity of the EEPROM 44 and thereby causing an overflow. Each trace record 134 includes a reserved bit 136, called a "tamper bit", that is set TRUE if the mechanical tamper input 66 to the microprocessor 40 is floating—e.g., if the plug 58 has been pulled through the circuit board 50 so as to break one of the wires 62, 63.

As noted above, a tested tag 10 is shipped from the tag manufacturer to an initial user with an "empty" EEPROM memory 44 (i.e., one that has the same overwritable fill byte written into every location thereof). The initial user may be an original equipment manufacturer (OEM) of an article to be protected. At the point in the process at which the tag 10 is to be attached to the article, the initial user will use his local computer 104 to prepare an initial data block 120. As is common in the art, some of the data in the initial block (such as the manufacturer's password 122 and phone number 128) will be available from the memory of the local computer 104, while other data elements in the block (e.g., the item identification record 126) will contain data elements, such as the manufacturer's serial number, that need to be entered into the local computer 104. The secret identification record 124 is preferably generated by an encryption algorithm that is executed by the OEM's local computer 104. The initial data block 120 will then be written into the EEPROM 44 with the interface unit 80, an action that will result in the lock byte 130 being set, and the tag microprocessor 40 thereafter refusing to modify any tracking data written into the EEPROM 44.

A concordance table relating the overt item identification record 126 and the secret item identification record 124 is also generated in the local computer 104 at the time of OEM initialization. This table is kept by the manufacturer so that an authorized purchaser or end user of the controlled part, who has retrieved the covert code 124 from a tag 10, can place a telephone call to the manufacturer and inquire if the covert and overt codes retrieved from a tag 10 in question match those in the concordance table, thereby determining if the protected part associated with the tag 10 in question is valid.

Figure 5:
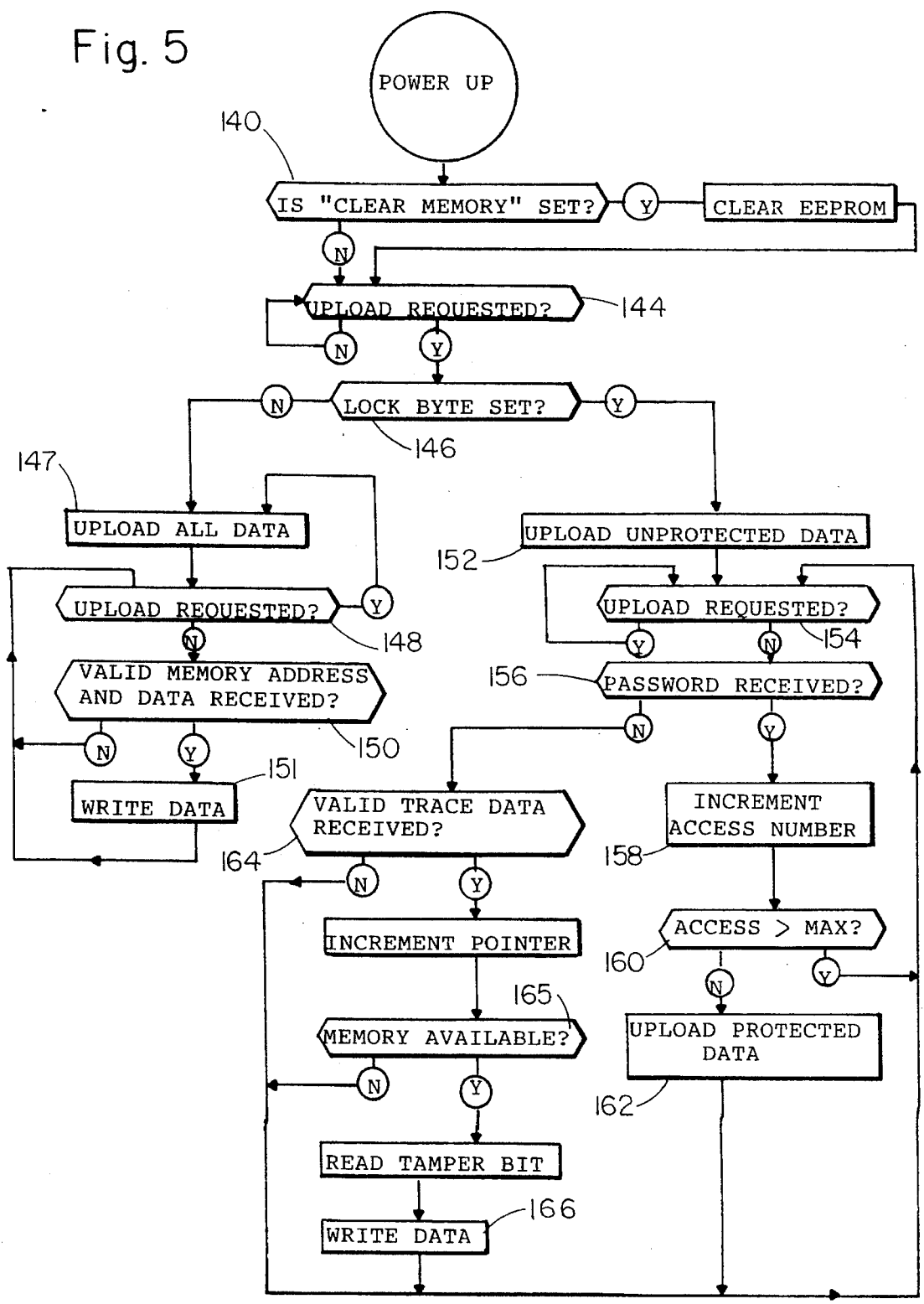
FIG. 5 of the drawing is a flow chart of the main control steps executed by the microprocessor in a tag.

Turning now to FIG. 5 of the drawing, one finds a flow chart showing the main steps executed by the tag microprocessor 40. When the tag powers up, the software first checks (Step 140) to see if the logical input 54 is set. As previously discussed, this is expected to be the case during tag testing, at which time the EEPROM is cleared, but the secure input 54 is not expected to be set thereafter. Following this check, the program enables the serial data receiver 34 and waits for an upload request (Step 144). When a request for data is received the program checks to see if the lock byte 130 is set (Step 146), which is expected to be the case except for the OEM's initial use of the tag, as previously discussed.

If the lock byte 130 is not set, the program uploads all the data stored in the EEPROM 44 (Step 147), waits for either an upload request (Step 148), or a valid download (write) request (Step 150), after which it receives and writes data to the EEPROM 44 (Step 151) and returns to wait for a request to upload and verify the stored data (Step 148). As previously noted, in the normal course of usage the data written in step 150 will include the lock byte 130, which will preclude the program from again entering this particular code module.

If the microprocessor finds the lock byte 130 is set in Step 146 the program follows the normal operating path by uploading the unprotected data (Step 152), and then waiting for either a further upload request or an additional command (Step 154). If a test password is received it is checked to see if it is the same as the valid password (Step 156). If the two passwords match, the number of accesses is incremented (Step 158) and checked (Step 160) to see if the current number of accesses exceeds a preset limit. If a maximum value assigned to the number of allowable accesses has been exceeded, the program enters a "do nothing" branch by returning control to Step 154, following which only the unprotected data are available from the tag. If, on the other hand, the number of accesses is within preset limits, the certificate number and the manufacturer's phone number are uploaded to the interrogator (Step 162).

Since a replacement part is expected to be handled a relatively small number of times, only a relatively small number (on the order of 5 to 10) of validity checks are expected. A large number of attempts to access the secret identification code 124 are treated by the present system as evidence of an attempt to tamper with the data's integrity.

If a message received by the tag does not include a password, but does include a new trace data download command and valid trace data (Step 164), the tag increments a trace data pointer and checks to see if memory overflow has occurred (Step 165). If there is room remaining in the EEPROM 44, a current trace record 134 (including both the downloaded data and the tamper bit 136) is written into the EEPROM 44 (Step 166). The trace record 134 is expected to include a number of parameters commonly used in inventory control systems, such as a transaction type code (e.g. logged out of manufacturer's warehouse), a date and a unique interrogation station identifying record that identifies the specific local computer 104 recording the transaction. In most cases the trace record is expected to be a fixed length record (e.g., twenty five bytes, as shown in FIG. 4), so that a predetermined number of such records can be written into that portion of the EEPROM 44 not previously used for data storage before the capacity of the EEPROM 44 is exhausted.

The inventory control system that employs the tag 10 of the invention is expected to use a plurality of local computers 104 that differ in the nature of the programs that they run. A relatively large proportion of the local interrogation computers 104 will be configured to read the part descriptor field (so that the operator can confirm that the tagged part is what was ordered, and to then write a trace record on the tag to indicate that the part was moved from one portion of the inventory system to another. That is, most local computers 104 in the overall inventory control system will not be supplied with a password, and will only have access to the unprotected data stored in the EEPROM 44. Other interrogation computers 104 will run a program that includes the password-based verification capabilities described previously herein. This latter set of interrogation computers may include those operated by an ultimate user organization that issues the part for installation on an aircraft. Since the multi-transaction inventory system described herein terminates with the delivery of the protected article to an end user, this is the point in the process where a check for tampering is most properly made.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed and desired to be secured by Letters Patent is:

1. Apparatus for tracking a controlled item, said apparatus comprising:

a tag operatively associated with said item, said tag comprising
 a tag microprocessor,
 a non-volatile memory operatively connected to said microprocessor, said non-volatile memory containing, as separate records therein, an access attempt number record, a valid password, a secret identification record, and a lock record set at an initialization time,
 means for receiving electrical power from an external source, and
 first communication means for communicating with a local interrogation station:
said local interrogation station comprising
 means for supplying electrical power to said tag,
 second communication means operatively associated with said first communication means, and
 a computer controlling said second communication means, said computer transmitting a test password to said tag by said second means;
said tag microprocessor acting under program control to read said lock record and, if said lock record is set, to increment said access attempt record on receiving said test password and to transmit said secret identification record to said interrogation station only if said test password matches said valid password and said access attempt number is less than a predetermined value, said tag microprocessor storing a record only once in any portion of said memory, other than that portion used for said access attempt record, if said lock record is set.

2. Apparatus of claim 1 wherein said interrogation station further transmits a trace record to said microprocessor, and wherein said microprocessor writes said trace record in said non-volatile memory only if said act of writing said trace record does not overflow said non-volatile memory.

3. Apparatus of claim 2 wherein said tag is associated with said item by being physically attached thereto by physical attachment means comprising a one-time actuable binary electric element, the state of said element irreversibly changed on the removal of said tag from said item, and wherein each said trace record comprises a datum representing the state of said element at the time said trace record is written.

4. Apparatus of claim 1 wherein said means of supplying electric power, and said means for communicating data comprise an inductive coupling between said tag and said interrogation station.

5. Apparatus of claim 1 wherein the means for supplying electrical power to the tag comprise a resonant circuit and wherein the tag comprises a storage capacitor and an inductive coupling circuit coupled to the resonant circuit, and wherein the tag is not electrically powered by other means.

6. An inventory tracking system comprising:

a plurality of interrogation stations, each said interrogation station comprising a computer controlling an interrogator, said interrogator comprising power supply and interface means, each said computer further comprising an interrogation station memory containing as a record therein a unique interrogation station identification record;

a plurality of tags, each said tag associated with a protected item, each said tag comprising
 means for receiving power from said interrogator power supply,
 tag communication means transmitting data to and receiving data from said interrogator interface means, and
 a tag microprocessor operating under program control to receive from a said computer at an initialization time, an initial record comprising a lock record, said microprocessor thereafter operating to receive a trace record comprising said interrogation station identification record, to write said interrogation station identification record into a non-volatile tag memory if said record can be written into a previously unused portion of said memory, said microprocessor otherwise not writing said record into said memory.

7. A system of claim 6 wherein said microprocessor further receives a test password from said interrogation station and transmits to said interrogation station a secret identification record stored in said non-volatile memory only if said test password matches a valid password stored in said non-volatile memory.

8. Apparatus of claim 6 wherein a said tag is associated with a said item by being physically attached thereto by physical attachment means comprising a one-time actuable binary electric element, the state of said element irreversibly changed on the removal of said a said tag from said a said item, and wherein each said trace record comprises a record of the state of said binary actuable element at the time of creation of said record.

9. Apparatus of claim 6 wherein said means of receiving electric power and said means for communicating data comprise an inductive coupling between a said tag and a said interrogator.

10. The tracking system of claim 6 wherein the means for receiving power from the interrogator power supply comprises the sole means of powering the tag.

11. Inventory tracking apparatus comprising a tag associated with a protected item, said tag comprising a tag microprocessor operating under program control, said tag further comprising a non-volatile memory operatively associated with said tag microprocessor, said non-volatile memory containing as separate records therein a settable lock record, a valid password, a secret identification record, an overt identification record, and an access attempt number record, said non-volatile memory further capable of storing a predetermined number of trace records, said tag further comprising communication means communicating with a interrogation station acting under operator control to communicate to said tag microprocessor ones of: a said trace record, each said trace record containing an interrogator identification record: a data upload request; and a test password;

wherein said tag microprocessor, reads said lock record, and if said lock record is set:

communicates said overt identification record to said interrogation station on receipt of said upload request;

writes a said trace record into said non-volatile memory only if no more than one fewer than said predetermined number of said trace records have been previously stored therein: and increments said access attempt number on the receipt of said test password request and thereafter communicates said secret identification record to said interrogation station only if said test password matches said valid password and said access attempt number is less than a predetermined maximum value.

12. Apparatus of claim 11, wherein said tag is associated with said item by being physically attached thereto by physical attachment means comprising a one-time actuable binary electric element, the state of said element irreversibly changed on the removal of said tag from said item.

13. Apparatus of claim 11 wherein said tag receives electric power from said interrogation station and communicates data to said interrogation station by means of an inductive coupling between said tag and said station.

14. A method of tracking a protected article through a multi-transaction distribution process terminated by delivery of said article to an end user thereof, said method comprising the steps of:

a) attaching to said article a tag comprising a one-time actuable binary electric element, the state of said element irreversibly altered by the removal of said tag from said article:

b) transmitting, from one of a plurality of interrogation stations to a microprocessor within said tag and storing, as separate records in a non-volatile memory operatively connected to said microprocessor, said memory having a predetermined capacity, a valid password, a secret identification record, an overt identification record, an access attempt number and a lock byte;

c) storing in said non-volatile memory, at a said transaction in said distribution process, a trace record comprising a tamper bit representative of said status of said binary element;

d) repeating step c) at a plurality of subsequent said transactions until either:

i) said capacity of said non-volatile memory is exceeded, or ii) said article is delivered to said end user.

15. The method of claim 14 further comprising the steps, after step d) ii) therein, of e) supplying, by means of a second interrogation station, a test password to said tag at a time of said delivery to said end user, f) comparing, within said tag, said test password and said valid password, and transmitting said secret identification record from said tag to said interrogation station only if said test password and said valid password match.

16. The method of claim 14 further comprising the additional steps after step b) of b1) transmitting a request for data from a second of said interrogation stations to said microprocessor and b2) thereafter receiving from said microprocessor said overt identification record.

17. The method of claim 14 further comprising the additional steps, after a repetition of step c) of d) transmitting a request for data from a second of said interrogation stations to said microprocessor and e) thereafter receiving from said microprocessor said overt identification record and a plurality of said trace records.

18. The method of claim 14 further comprising the steps, after Step d) ii) therein, of e) reading, at a first location proximate the end user, the secret identification record and the overt identification record, f) communicating the secret identification record and the overt identification record to a central computer at a second location remote from the first location, the central computer having stored in memory means associated therewith a concordance table comprising a plurality of pairs of records, g) matching, by means of the central computer, the secret identification record with one of the records stored in the concordance table and matching the overt identification record with that record paired with the matched stored record, and h) communicating to the first location a message declaring the tag to be valid.

19. A system for validating the identity of a protected article passing through a plurality of handling transactions, the system comprising a tag operatively associated with the protected article, the tag comprising a tag microprocessor having non-volatile computer memory operatively associated therewith, the nonvolatile memory having stored therein a first covert identification record, a first overt identification record, an access attempt number, and a valid password, a local computer at a first location comprising means communicating a test password to the tag microprocessor, the tag microprocessor thereupon reading the access attempt number and, if the value thereof is less than a predetermined value, incrementing the access attempt number and communicating both the first covert identification record and the first overt identification record to the local computer if the test password matches the valid password, means at the first location communicating the first covert identification record and the first overt identification record to a second location remote from the first location, and a concordance table at the second location, the concordance table comprising a plurality of valid covert identification records, each uniquely associated with a valid overt identification record, wherein the identity of the protected article is deemed valid only if one of the plurality of valid covert identification records in the concordance table and the valid overt identification record uniquely associated therewith respectively match the first covert identification record and the first overt identification record.

20. The system of claim 19 wherein the local computer comprises telecommunication means at the first location communicating the covert identification record and the overt identification record over the public switched telephone network to a central computer at the second location, the central computer storing the concordance table.

* * * * *